(12) United States Patent
Eigler et al.

(10) Patent No.: US 6,821,112 B2
(45) Date of Patent: Nov. 23, 2004

(54) INJECTION MOLDING HOT RUNNER NOZZLE WITH REMOVABLE SEAL

(75) Inventors: Frank J. Eigler, Windsor (CA); Rui Novo, Lake Orion, MI (US)

(73) Assignee: D-M-E Company, Madison Heights, MI (US)

(*) Notice: Subject to any disclaimer, the term of this patent is extended or adjusted under 35 U.S.C. 154(b) by 177 days.

(21) Appl. No.: 10/297,893

(22) PCT Filed: Jun. 15, 2001

(86) PCT No.: PCT/US01/19351

§ 371 (c)(1),
(2), (4) Date: Dec. 10, 2002

(87) PCT Pub. No.: WO01/98053

PCT Pub. Date: Dec. 27, 2001

(65) Prior Publication Data

US 2003/0211199 A1 Nov. 13, 2003

Related U.S. Application Data

(60) Provisional application No. 60/212,149, filed on Jun. 16, 2000.

(51) Int. Cl.[7] ............................................... B29C 45/20
(52) U.S. Cl. .................................. 425/549; 264/328.15
(58) Field of Search ................................ 425/549, 572; 264/328.15

(56) References Cited

U.S. PATENT DOCUMENTS

| 5,015,170 | A | | 5/1991 | Gellert |
| 5,208,052 | A | | 5/1993 | Schmidt et al. |
| 5,219,593 | A | | 6/1993 | Schmidt et al. |
| 5,499,916 | A | | 3/1996 | Schad et al. |
| 5,554,395 | A | | 9/1996 | Hume et al. |
| 6,394,785 | B1 | * | 5/2002 | Ciccone ...................... 425/549 |
| 6,533,571 | B2 | * | 3/2003 | Fikani ........................ 425/549 |
| 6,709,262 | B2 | * | 3/2004 | Fong .......................... 425/549 |

FOREIGN PATENT DOCUMENTS

DE 4415506 3/1997

* cited by examiner

Primary Examiner—Tim Heitbrink
(74) Attorney, Agent, or Firm—John W. Gregg; Stephen H. Friskney

(57) ABSTRACT

A flow nozzle (10) that conveys plastic melt from an injection unit of a molding machine to a mold cavity (72) has an improved, removable seal design. The nozzle body (12) is designed to threadedly receive a nozzle tip (24) that includes an outlet (30) that communicates with the mold cavity. A thin-wall, cylindrical seal ring (40) includes a compression portion that is received between the nozzle body and nozzle tip and is compressed to create a seal between these two elements when the tip is assembled to the nozzle body. The seal ring further includes a sealing portion (50) that encircles the nozzle tip and has an outer diameter slightly larger than the outer diameter of the nozzle body.

7 Claims, 2 Drawing Sheets

INJECTION MOLDING HOT RUNNER NOZZLE WITH REMOVABLE SEAL

This application is a national stage application of PCT/US01/19351 filed Jun. 15, 2001 which claims the benefit of U.S. Provisional Application No. 60/212,149 filed Jun. 16, 2000.

TECHNICAL FIELD

The present invention relates to flow nozzles that are adapted to receive plastic melt from the injection unit of an injection molding machine and direct it into a mold cavity. More particularly, the present invention relates to an improved flow nozzle that includes a removable sealing member that extends from the body of the flow nozzle to prevent leakage of plastic melt around the flow nozzle during the injection process.

BACKGROUND ART

In the injection molding of thermoplastic materials, a system is provided to convey the plastic melt supplied by the injection unit of the molding machine to the mold cavities. A key element is the injection nozzle, which is in fluid communication with the outlet of the injection unit and mates with the primary gate location (inlet opening) of the mold. The nozzle serves to convey the plastic melt from the outlet of the injection molding machine into the mold cavity, and it generally has an associated heater for maintaining the plastic melt at the desired temperature, thereby optimizing flow properties so that it fills the entirety of the mold cavity. It is particularly important that the nozzle seal effectively in the area adjacent the mold cavity to avoid leakage of plastic melt during the high pressure of injection.

Several sealing methods are commonly used in the industry namely, (a) sealing on the body, (b) a press-fit seal ring on the nozzle tip and (b) a flexible seal ring on the nozzle tip. The method of sealing on the nozzle body has been used for numerous years by many companies. This seal design relies on radial thermal growth of the nozzle body so that it compresses against the surrounding mold surface and accomplish the sealing task. The drawback of sealing on the nozzle body is that if the sealing surface is damaged, an expensive component, i.e., the nozzle body (made of tool steel and usually heat-treated), must be replaced.

An alternative prior art design employs a front seal member that is press-fit or shrink-fit onto the nozzle tip. The seal member is relatively flexible so that it does not have to rely only on thermal growth to properly seal. That is, the ring grows radially due to the increase in temperature, but also springs radially outward due to the pressure of the plastic melt during injection. The disadvantages of this design include: (1) the component parts have to be machined to very close tolerances in order to be press-fit or shrink-fit together; (2) during the process of press/shrink-fitting the parts together, the seal can lose its required concentricity, possibly necessitating a post-assembly machining operation; (3) if the tip is heated to a very high temperature, there is the risk that the seal will slide completely off the tip especially if the tip is made from TZM material (the thermal expansion of the seal ring is greater than the expansion of the tip)—to minimize this possibility, a very large press/shrink-fit interference is required, placing high stresses on both the tip and the seal ring even before they put into use; and (4) if the seal needs to be replaced, the customer must replace both the tip and seal ring as they are typically sold as an assembly.

A flexible seal ring is described on U.S. Pat. No. 5,554,395. This design is based on the concept that the seal will "spring" radially due to the pressure of the plastic melt during injection. Basically this design uses a standard "C" cross section seal ring that can be purchased from any seal ring manufacturer. This type of seal ring is also press-fit onto the tip, so that assembly of the ring would likely require special tooling. The difference between earlier press-fit seals and this patented seal appears to be the shape of the seal ring. The patented seal employs a thin (0.006–0.010" wall) seal, whereas earlier designs uses a much thicker wall seal.

Another method employed in the industry for sealing the nozzle involves using a retainer to seal where the tip is held inside the body by a retainer (housing) and the sealing diameter is on the retainer. The seal works basically the same way as that of sealing on the nozzle body: it relies on thermal growth and usually seals right at the mold gate.

DISCLOSURE OF INVENTION

Briefly stated, in accordance with one aspect of the present invention, a flow nozzle is provided to convey the plastic melt supplied by the injection unit of the molding machine to the mold cavities. The flow nozzle includes a nozzle body having a passageway therethrough that extends from a plastic melt inlet to an outlet. The nozzle body is designed to threadedly receive a nozzle tip that seats in the mold gate and includes the outlet that communicates with the mold cavity. A thin-wall, cylindrical seal ring includes compression portion that is received between the nozzle body and nozzle tip and is compressed to create a seal between these two elements when the tip is assembled to the nozzle body. The seal ring further includes a sealing portion that encircles the nozzle tip and has an outer diameter slightly larger than the outer diameter of the nozzle body.

The present overcomes the disadvantages of sealing on the nozzle body since it employs a separate seal. The nozzle body of the present invention does not have a sealing surface, as such, that is prone to damage. Rather, with the present invention, only the seal ring would have to be replaced if the sealing surface is damaged, allowing use of an inexpensive replacement part (the seal ring) instead of a more expensive component (the nozzle body). In addition, by having a separate seal, a material with a lower thermal conductivity can be used to minimize the thermal losses at the seal.

The present invention has a further advantage over the prior art in that the seal ring does not depend on a press-fit or shrink-fit to create a seal with the nozzle tip. Instead, the invention relies on an axial compressive load on the seal ring to generate the sealing boundary between the tip, the seal ring and the nozzle body. Of course, the prior art designs, as well as the invention, rely on radial sealing for the seal/mold gate boundary. Accordingly, the present invention does not encounter any of the above-noted problems that are associated with prior art designs, since the seal ring and the tip are separately replaceable with respect to the nozzle body.

The present invention is also an improvement over the seal described in U.S. Pat. No. 5,554,395 in that it does not have a "C" shape cross-section or any of the other special shapes mentioned in the patent. The present invention is a thin, long, cylindrical seal axially aligned with the nozzle body, and does not rely solely on the pressure of the plastic melt to create the desired seal. As with other prior art designs, this patented seal is forced onto the tip and consequently relies on a radial interference. In contrast, the present invention relies on axial compression to form the seal between the tip and seal ring.

BEST MODE FOR CARRYING OUT THE INVENTION

Figure 1:
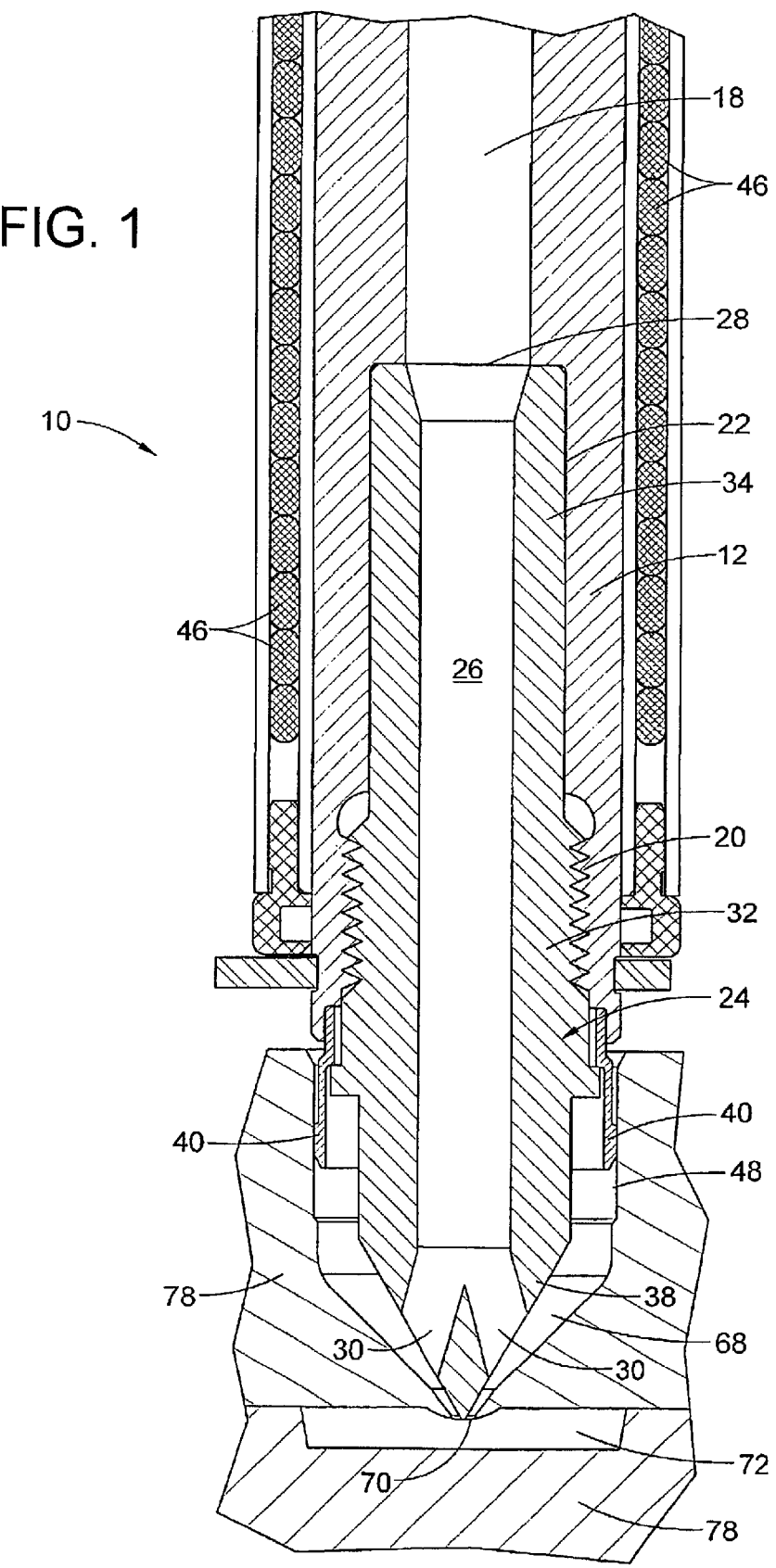
FIG. 1 is a cross-sectional view of a flow nozzle and removable seal in accordance with the present invention.

Referring now to the drawings, there is shown a flow nozzle 10 in accordance with the present invention. The flow nozzle 10 includes a nozzle body 12, preferably formed from stainless steel, H-13 or other suitable material, having a plastic melt passageway 18 that extends axially through the nozzle body 12. An internal thread 20 is provided in the nozzle body 12 adjacent one end of the plastic melt passageway 18 and is adapted to receive a nozzle tip 24.

As illustrated in the drawings, the nozzle tip 24 includes an axial passageway 26 that extends from an inlet 28 to an outlet 30 through which plastic melt is conveyed. The nozzle tip 24 is preferably made from a beryllium-copper alloy for good heat transfer, and has a generally cylindrical body 32 with an elongated cylindrical end 34 adjacent to the material inlet 28. A cylindrical end 34 of the nozzle tip 24 is adapted to be received within a recess 22 formed in the nozzle body 12. The nozzle tip 24 also has a generally conical outer end 38 adjacent to the melt outlet 30. The outlet 30 can be a unitary opening, or it can be defined by a plurality of openings spaced about the outer surface of the outer end 38, to provide for more uniform lateral distribution of plastic melt, as generally known in the art; two such openings are shown in the drawings.

A seal ring 40 encircles the lower portion of the cylindrical body 32 of the nozzle tip 24 and is also at least partially received within the recess 14 formed in the nozzle body 12. In particular, the recess 14 of the nozzle body 12 has a shoulder 16 that receives an inner seal portion 42 of the seal ring 40, see FIG. 2. The nozzle tip 24 has an outwardly extending shoulder 44 sized to engage the inner seal portion 42 of the seal ring 40. With the associated parts being so configured, the inner seal portion 42 is compressed when the nozzle tip 24 is tightened in the nozzle body 12, thus creating an effective seal between the nozzle body 12 and nozzle tip 24.

The assembled flow nozzle 10 preferably includes an external, electrical resistance heater 46 that, as shown, is of helical form and extends around and along substantially the entire length of the nozzle body 12. In its preferred form, the resistance heater 46 is a continuous helical coil that is formed from a heating element that has a generally elongated cross-section. The resistance heater 46 terminates near the end of the nozzle body 12 and connects with a source of electrical power.

Figure 2:
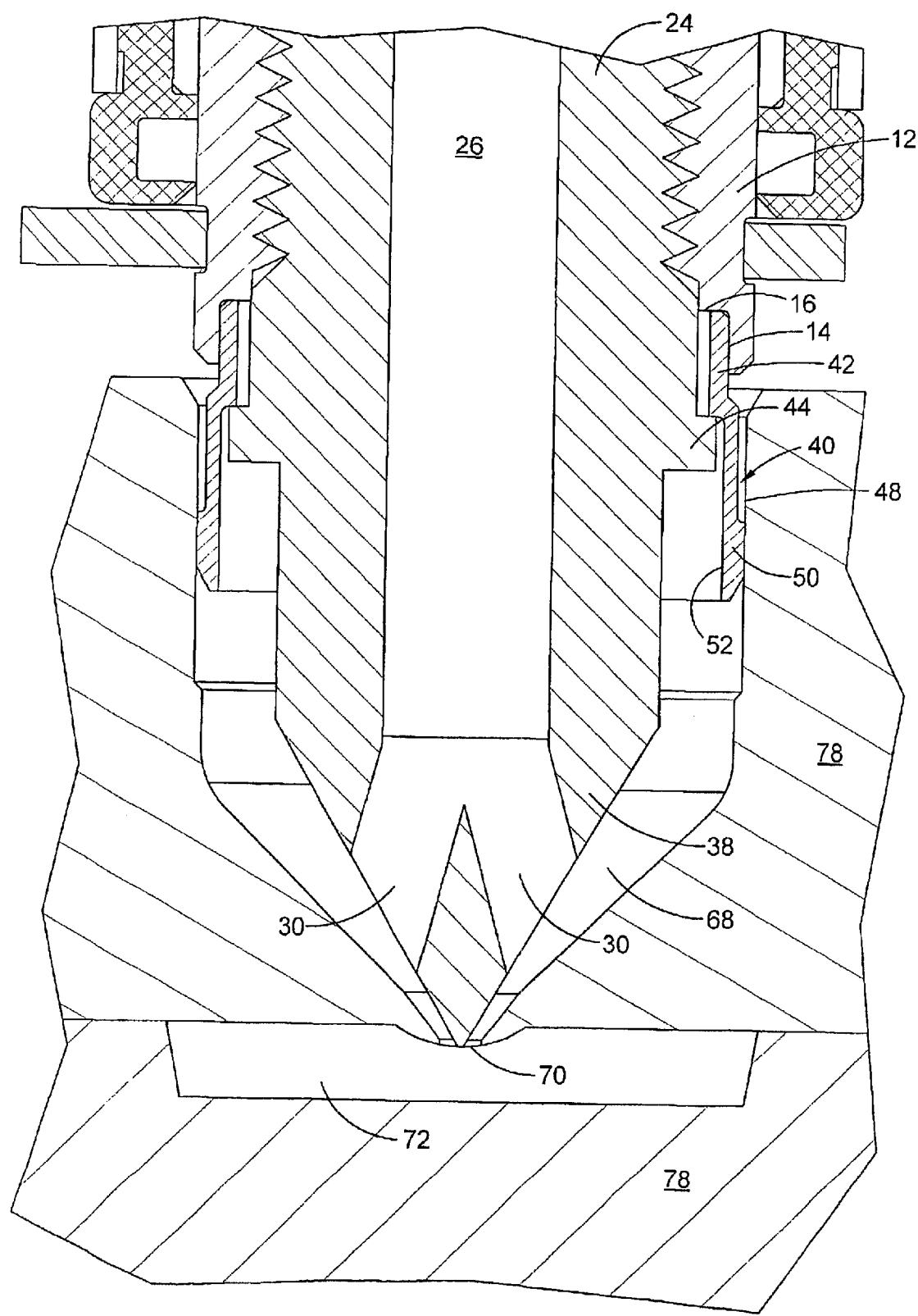
FIG. 2 is an enlarged, cross-sectional view of sealing elements of the flow nozzle shown in FIG. 1.

The arrangement of the several parts of the flow nozzle 10 in its assembled form is best seen in FIG. 2. As shown, the seal ring 40 has an outer seal portion 50 extending from the inner seal portion 42. The outer seal portion 50 is sized to fit snugly within a mating recess 48 in a mold 78, as will be described in greater detail below. Although shown as cylindrical in form, the nozzle body 12 can be of any desired form, so long as it includes a flow passageway and a recess for receiving the nozzle tip 24. Additionally, the passageway 26 within the nozzle tip 24 is positioned so that it is aligned with the passageway 18 of the nozzle body 12 to permit smooth, unimpeded flow of plastic melt through the nozzle body 12 and through the nozzle tip 24 to the outlet 30 at the outer end 38 of the nozzle tip 24. Preferably, the nozzle tip 24 is made from a beryllium-copper alloy for good heat transfer and can be nickel plated to increase surface hardness.

As shown in the drawings, the seal ring 40 is preferably in the form of a ring-like element and includes an inner seal portion 42 that is received within the recess 14 and engages the shoulder 16 of the nozzle body 12. An oppositely extending, concentric cylindrical outer seal portion 50 completes the outer geometry of the seal ring 40. Finally, the seal ring 40 has a relatively thin wall and an axial length that are suitable to provide the proper sealing functions, as further described below.

FIG. 2 shows the flow nozzle 10 in its operative position relative to a mold 78 that defines a mold cavity 72 that defines the shape of the article to be molded. Mold cavity 72 includes an opening or gate 70 through which the plastic melt passes after it flows from the material outlet 30 of the nozzle tip 24. Additionally, an open area 68 within the mold recess 48 and immediately outward of the gate 70 defines a plastic melt collection area to ensure complete filling of the mold cavity 72 with the plastic melt. During injection of the plastics melt into the mold cavity 72, the open area 68 is pressurized by the melt flow, subjecting the inner surface 52 of the outer seal portion 50 of the seal ring 40 to the injection pressure. With the outer surface of the seal ring 40 being subject only to ambient pressure, the pressure gradient tends to enhance the seal between the outer seal portion 50 of seal ring 40 and the recess 48 in the mold 78.

The seal ring 40 functions in a very simple manner. The seal ring 40 is placed inside the nozzle body 12. The respective diameters are sized so that the seal ring 40 fits within the nozzle body 12. That is, the relative positioning of the inner seal portion 42 of the seal ring 40 is determined by the recess 14 within the nozzle body 12. The nozzle tip 24, which can be a point gate as shown, or any other type of tip e.g., through hole, extended point gate, etc., is then threaded into the nozzle body 12 and tightened. At a predetermined torque level, the inner seal portion 42 of the seal ring 40 will start to compress. This compression is required to ensure that there is a fluid-tight seal between the nozzle tip 24 and the nozzle body 12, provided by the contact between the nozzle body 12, the seal ring 40 and the nozzle tip 24.

Once the molding process is started and heat is applied to the flow nozzle 10, the outer seal portion 50 of the seal ring 40 will dimensionally increase to create a seal with the mating recess 48 in the mold 78. If the processing temperature is not high enough to cause sufficient thermal expansion to ensure a complete seal, then the outer seal portion 50 of the seal ring 40 is flexible enough that the pressure of the plastic melt will provide sufficient force to create an effective seal. Accordingly, the seal ring 40 relies on axial compression for the inner seal portion42, plus thermal expansion and, if necessary, injection pressure for the outer seal portion 50.

In order to optimize the design, the seal ring 40 should be made of a low thermal conductive material such as Titanium 6AI-4V, which is generally available in the industry. The seal ring 40 should be as thin as possible, preferably in the range of 0.20 to 0.50 mm (0.008 to 0.020 in.) and should also be as long axially as possible while still maintaining structural integrity. This construction will minimize the amount of heat loss through the seal ring 40 and allow for easier processing of all resins. This is of particular importance for crystalline engineering grade resins such as nylon. Although the seal ring 40 is preferably made out of titanium, it can be made out of other materials such as stainless steel depending on thermal and mechanical properties and cost objectives required.

INDUSTRIAL APPLICABILITY

The foregoing discussion and the illustrated embodiment of the invention teach a flow nozzle designed to convey the plastic melt supplied by the injection unit of a molding machine to the mold cavities. Rather than sealing on the nozzle body as in the prior art, the present invention employs a seal ring that is separable from the nozzle body. Accordingly, only the seal ring has to be replaced if the seal between the nozzle and mold gate is damaged, allowing use of an inexpensive replacement part (the seal ring) instead of a more expensive component (the nozzle body). In addition, by having a separate seal, a material with a lower thermal conductivity can be used to minimize the thermal losses at the seal. The assembly can be used with or without a gate shell (tip) insulator.

Although particular embodiments of the present invention have been illustrated and described, it will be apparent to those skilled in the art that changes in modifications can be made without departing from the concepts of the present invention. Accordingly, it is intended to encompass within the appended claims all such changes and modifications that fall within the scope of the present invention.

What is claimed is:

1. A flow nozzle (10) to convey plastic melt to a mold cavity (72), the flow nozzle (10) including a nozzle body (12) having a central passageway (18) that extends from a plastic melt inlet to an outlet (30), and a nozzle tip (24) threadedly received in the nozzle body (12), the nozzle tip (24) being configured to be received in a mold gate (70) and to include the outlet (30) that communicates with the mold cavity (72), characterized in that the flow nozzle (10) further comprises a thin-wall, cylindrical seal ring (40) having a compression portion (42) that is received between the nozzle body (12) and nozzle tip (24), such that the compression portion (42) of the seal ring (40) is compressed to create a seal between the nozzle body (12) and nozzle tip (24) when the tip is assembled to the nozzle body (12), the seal ring (40) also having an outer sealing portion (50) that encircles the nozzle tip (24).

2. A flow nozzle (10) in accordance with claim 1 characterized in that the outer sealing portion (50) of the seal ring (40) has an outer diameter slightly larger than the outer diameter of the nozzle body (12).

3. A flow nozzle (10) in accordance with claim 1 characterized in that the compression portion (42) of the seal ring (40) has a wall thickness in the range of 0.20 to 0.50 mm.

4. A flow nozzle (10) in accordance with claim 1 characterized in that the compression portion (42) of the seal ring (40) is received within a recess (14) in the nozzle body (12).

5. A flow nozzle (10) in accordance with claim 4 characterized in that the compression portion (42) of the seal ring (40) is trapped between a shoulder 16) in the recess (14) of the nozzle body (12) and a shoulder (44) extending radially outward from the nozzle tip (24).

6. A flow nozzle (10) in accordance with claim 5 characterized in that the outer sealing portion (50) of the seal ring (40) extends below the shoulder (44) of the nozzle tip (24) and has an outer diameter slightly larger than the outer diameter of the nozzle body (12).

7. A flow nozzle (10) in accordance with claim 6 characterized in that both the compression portion (42) and outer sealing portion (50) of the seal ring (40) have a wall thickness in the range of 0.20 to 0.50 mm.

* * * * *